INVENTORS
J. A. CHILMAN,
A. G. MAPP +
J. CRIPPS

By Wilkinson + Mawhinney
ATTYS.

March 25, 1958   J. A. CHILMAN ET AL   2,828,427
POLYPHASE ALTERNATING CURRENT SYSTEMS
Filed Oct. 10, 1955   2 Sheets-Sheet 2

INVENTORS
J. A. CHILMAN,
A. G. MAPP +
J. CRIPPS
by Wilkinson + Mawhinney
ATTYS.

United States Patent Office 2,828,427
Patented Mar. 25, 1958

2,828,427

POLYPHASE ALTERNATING CURRENT SYSTEMS

John Alfred Chilman, Alfred George Mapp, and John Cripps, Gloucester, England, assignors to Rotol Limited, Gloucester, England, a British company Application October 10, 1955, Serial No. 539,583

Claims priority, application Great Britain October 13, 1954

8 Claims. (Cl. 307—57)

This invention relates to polyphase alternating current systems of the kind (hereinafter referred to as a polyphase alternating current system of the kind described) comprising a plurality of alternators driven by separate prime movers and arranged for connection in parallel to a common utilisation network, and concerns the means provided for obtaining synchronism and phase agreement between the network and an alternator which is to be connected to the network.

For synchronising an incoming engine-alternator unit with a utilisation network it has already been proposed in the specifications accompanying United States Patent No. 2,710,355, granted June 7, 1955, to use a synchronising apparatus of the kind described in United States Patent No. 2,296,177, granted September 15, 1942, and British Patent No. 516,613, filed May 11, 1938, accepted January 5, 1940, and sealed and granted March 28, 1940, the arrangements comprising a single dynamo-electric machine of the kind (hereinafter referred to as a dynamo-electric machine of the kind described) having one or more fixed stators, at least two polyphase windings to one of which current from the network is supplied and to the other of which the current from the incoming alternator is supplied, whereby two contra-rotating electromagnetic fields are generated in the said dynamo-electric machine and having a rotor such that the rotor tends to rotate at a speed corresponding to the difference between the speeds of the two rotating fields, and means actuated by the movement of the rotor to change the speed of the incoming engine-alternator unit to synchronise it with the network.

In the arrangement described in the above-mentioned specifications accompanying United States Patent No. 2,710,355, granted June 7, 1955, additional means including a two-phase motor are described for the initiation of paralleling at a moment of phase agreement between the network and the incoming alternator.

The present invention is based upon an appreciation of the fact that at moments of phase agreement of the two polyphase supplies to a dynamo-electric machine of the kind described the rotor of the machine is always in one of an even number of angular positions relatively to the stator, and the principal object of the invention is to make use of this property to effect a simplification of the polyphase system by eliminating the need for separate means for initiating paralleling.

The invention consists in a polyphase alternating current system of the kind described comprising for each prime-mover-alternator unit a single dynamo-electric machine having a rotor operatively connected to means for controlling the power transmitted to the alternator from the prime-mover thereby to change the frequency of that alternator, one or more fixed stators and two polyphase windings energisable from separate sources to cause the rotor to rotate at a speed proportional to the difference between the frequencies of the said sources, means for connecting one of said polyphase windings to the utilisation network and the other of said polyphase windings to the output of the associated alternator in such manner as to cause rotation of said rotor at a rate proportional to the difference between the frequency of the network and the frequency of the associated alternator and in a sense to reduce such difference by control of the power transmitted to the associated alternator, a tie-breaker switch for connecting the associated alternator to the network, and means associated with said rotor for actuating said tie-breaker switch in the closing sense when said rotor is in a position relatively to said fixed stator or stators corresponding to phase agreement of the supplies to said polyphase windings and when the difference between the frequencies of said supplies is within the pull-in range of the associated alternator.

In a preferred arrangement according to the invention the tie-breaker switch comprises electromagnetic operating means, and the means associated with the rotor for actuating the tie-breaker switch comprises first switch contacts closed by said rotor in each position of the rotor relatively to its associated stator or stators corresponding to phase agreement of the supplies to said polyphase windings and for a period of time dependent upon the rate of rotation of said rotor, and second switch contacts closed after a fixed period of time by delay action means set in operation by the closing of said first switch contacts, said first and second switch contacts being arranged in series circuit with said electromagnetic operating means.

We are aware that it is known to control the closing of a tie-breaker switch by the co-operation of a pair of contacts operable by means sensitive to phase displacements between the utilisation network and the incoming alternator and a pair of contacts closed by a time-delay mechanism, and it will be appreciated that we make no claim to this combination per se.

According to a feature of the invention there may be provided switch means for changing over the dynamo-electric synchronising machine, when the associated alternator has been paralleled, to operate the power control means in response to changes in the ratio of the load on the associated alternator to the load on one or more of the other alternators. In this manner the redundancy of the dynamo-electric machine, once the associated alternator has been paralleled, is obviated.

These and other features of the invention are illustrated by way of example in the accompanying drawings.

Figure 1:
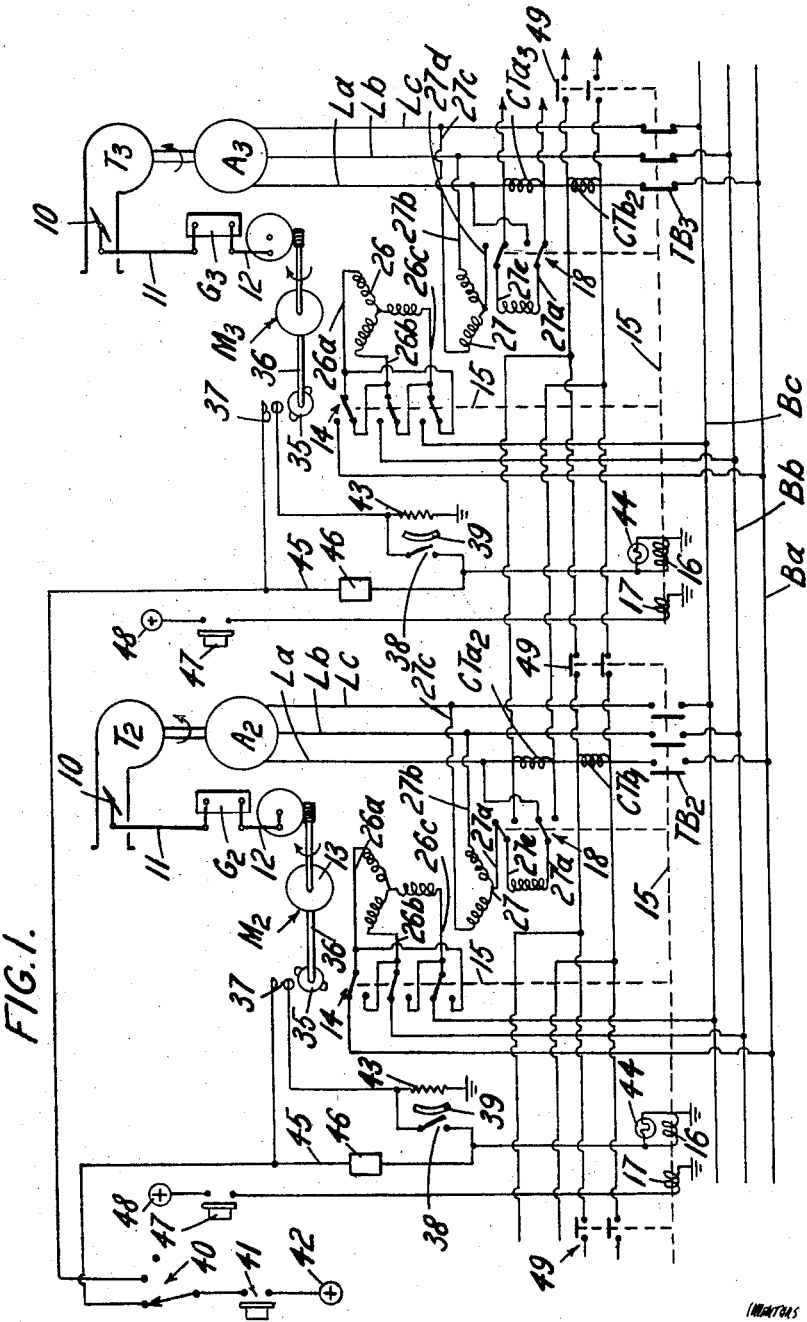
Figure 1 shows part of a three-phase alternating current system comprising two or more engine-alternator units, of which two only and their principal attendant controls are shown.

Figure 1 will be taken, by way of example, as indicating the principal circuits and attendant controls of two alternators $A_2$ and $A_3$ of a three-phase system comprising four alternators. As will be apparent from the following description, however, the circuits and controls attendant upon each alternator are identical, so that Figure 1 could equally well apply to a system comprising only two alternators or to any system comprising more than two alternators.

Figure 2:
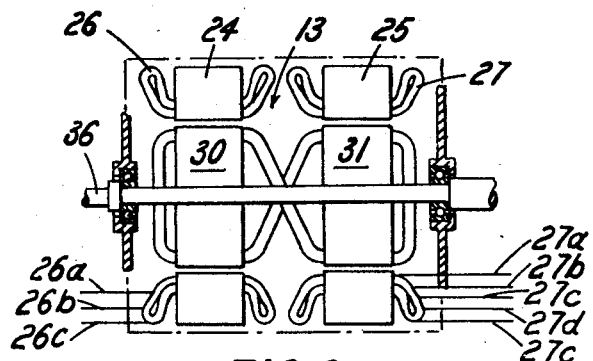
Figures 2 and 3 illustrate one construction of the dynamo-electric synchronising machine used in the system shown in Figure 1.

In the system shown in Figure 1, the three-phase alternators $A_2$ and $A_3$ are driven respectively by separate air turbines $T_2$ and $T_3$. The alternators are arranged for connection in parallel to tie bars $Ba$, $Bb$ and $Bc$ by means of tie-breaker switches $TB_2$ and $TB_3$ respectively which connect their output lines $La$, $Lb$ and $Lc$ to the tie bars having the corresponding suffix. Each air turbine is provided with a power control throttle 10 connected by a transmission 11 with a variable datum governor $G_2$ and $G_3$ respectively, the datum controls of the governors being connected by a further transmission 12 to the rotor 13 of a dynamo-electric machine $M_2$ and $M_3$ respectively. The construction of these machines, apart from certain details necessary for their adaptation for the purposes of the present invention, is described in United States Patent No. 2,296,177, granted September 15, 1942, and British Patent No. 516,613, filed May 11, 1938, accepted January 5, 1940, and sealed and granted March 28, 1940, but for convenience will be repeated in part with reference to Figures 2 and 3 of the accompanying drawings.

Each dynamo-electric machine comprises two fixed stators 24 and 25 with three-phase windings 26 and 27. The winding 26 is permanently connected in star arrangement as shown in Figure 1 and has input conductors 26a, 26b and 26c which, by means of a switch 14 may either be connected to the tie bars Ba, Bb and Bc of corresponding suffix so as to produce a rotating field in the dynamo-electric machine, or may be connected together so as to short-circuit the winding upon itself. As indicated by the dotted lines 15 each switch 14 is operated in common with the tie-breaker switch pertaining to the same alternator so that when the said tie-breaker switch is open, as in the case of switch $TB_2$ in Figure 1, the winding 26 is connected to the tie bars, and when the tie-breaker switch is closed, as in the case of $TB_3$, it is short-circuited upon itself. Each tie-breaker switch is operated, in a manner presently described, by a closing coil 16 and an opening coil 17.

The winding 27 is designed for use either as a three-phase winding or as a two-phase winding, and for this purpose the phase "a" is provided with a separate star point conductor 27e in addition to its input conductor 27a, while the phases "b" and "c" are provided with a common star point conductor 27d in addition to their input conductors 27b and 27c. The conductors 27b and 27c are permanently connected to the output lines Lb and Lc respectively of the associated alternator, while the conductors 27a, 27d and 27e are connected to a switch 18 also operated in common with the tie-breaker switch of the associated alternator. The switch 18 is so arranged that when the tie-breaker switch is open, as in the case of $TB_2$, the star point conductors 27e and 27d are connected together and the input conductor 27a is connected to the output line La of the associated alternator. In this condition therefore the winding 27 operates as a three-phase winding supplied from the output lines of the associated alternator and produces a rotating field in the dynamo-electric machine, the connections being such that the field rotates in the opposite direction to that of the field produced by the winding 26.

In its other position, corresponding to the closed position of the associated tie-breaker switch (see switch $TB_3$) the switch 18 separates the star point conductor 27e from the star point conductor 27d and the input conductor 27a from the line La and connects these conductors 27e and 27a to the ends of the secondary windings of a pair of current transformers, for example $CTa_2$ and $CTb_2$ in the case of the system pertaining to alternator $A_2$, one of which current transformers is in the output line La of the associated alternator and the other of which is in the output line La of the next alternator, the arrangement forming a closed chain in the sense that the second current transformer of the control system of the last alternator is in the output line La of the first alternator. This arrangement constitutes a load-sharing system as more fully described in the specification of our co-pending patent application United States Serial No. 539,581, filed October 10, 1955, now Patent No. 2,791,700, granted May 7, 1957.

Figure 3:
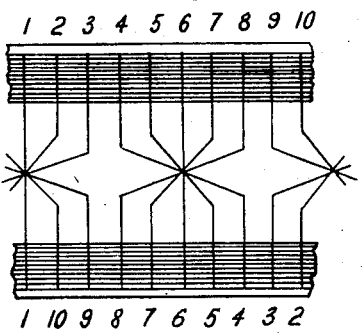

The rotor 13 of each dynamo-electric machine comprises two elements 30 and 31 which are wound in the manner shown diagrammatically in Figure 3. That is to say, each element has two poles and five slots per pole, the windings on each element being reversed with respect to the windings on the other element and the windings being connected in common to end-rings. It will be seen that an oscillating flux common to both elements can only penetrate such a winding non-inductively at the diameter containing slots No. 1 and No. 6. The rotor shaft will therefore tend to take up a position in which the magnetic reluctance is a minimum and, in taking up this position, the rotor will rotate at a speed corresponding to half the difference (i. e. half the algebraic sum) of the speeds of rotation of the two rotating fields produced by the stator windings 26 and 27 when these latter are supplied with current at different frequencies, as in the case when the associated alternator is being synchronised for paralleling, its tie-breaker switch being still open and the windings 26 and 27 being connected, as already explained, to the tie bars and the output lines of the alternator respectively.

It follows from the explanation given above, that at moments of phase agreement between the supplies to the two stator windings the rotor will always be in one of two possible positions in relation to the stator, but the reason for this will perhaps be more clearly understood from the following explanation with reference to Figures 4 to 7, which represent in diagrammatic form the two rotor elements 30 and 31 and the two stator elements 24 and 25 forming fields rotating in the directions indicated by the arrows R and instantaneously directed, as to their north poles, as indicated by the arrows N.

Figure 4:
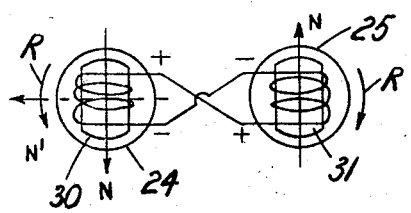
Figures 4, 5, 6 and 7 are explanatory diagrams illustrating the operation of the machine shown in Figures 2 and 3.

In the condition shown in Figure 4 the two rotating fields are in opposition, and it will be seen that the induced voltages in the two parts of the rotor winding are also in opposition, so that no current will flow through the rotor winding.

Figure 5:
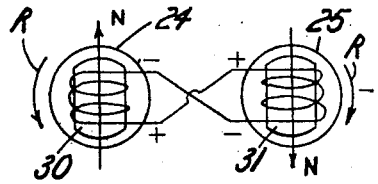

Figure 5 shows the field directions reversed, half a cycle later, but with the rotor still in the same position. It will be seen that the voltages induced in the two parts of the rotor winding, although now in the opposite directions, still oppose one another. Similarly it can be shown that with the rotor in this position relatively to the stators the voltages induced in the two parts of the rotor winding are equal and opposite at all instants of the alternating current cycle. Thus, so long as the stator frequencies remain equal, no current will flow in the rotor winding while the rotor remains in this position, and thus no torque will be produced tending to move it out of this position.

Figure 6:
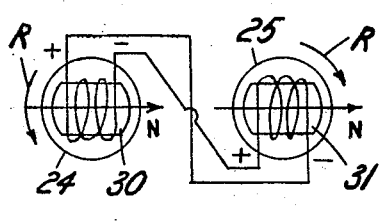

Figure 6 shows the condition a quarter of a cycle later than Figure 4, the two stator fields being still in phase agreement as in Figures 4 and 5, but the rotor being moved round anticlockwise through 90°. It will be seen that in this case the voltages induced in the two parts of the rotor winding are additive and thus maximum current will flow through the winding. Similarly it can be shown that with the rotor in this position relatively to the stators the induced voltages are additive at all parts of the alternating current cycle. Consequently, torque is produced tending to move the rotor out of this position.

Figure 7:
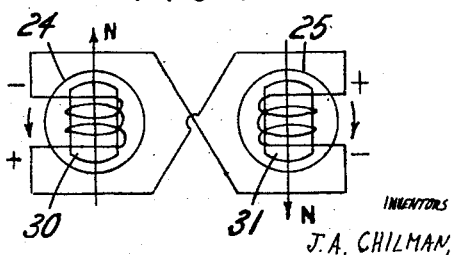

Figure 7 shows the rotor moved through a further 90°, the two stator supplies still remaining in phase agreement, and it will be seen that the voltages induced in the rotor winding are again in opposition, so that the rotor current and torque are again zero.

It is thus established that for a fixed phase relationship between the two rotating fields (i. e. between the supplies to the stator windings) there are two positions of the rotor (180° apart) at which zero current flows through the rotor, and that at intermediate positions of the rotor currents are induced in the rotor windings rising to a maximum at 90° to the zero current position.

It follows therefore, according to the fundamental laws of magnetic repulsion, that the rotor will, if unrestrained, take up one of the two positions of zero current.

As already stated, Figures 4 to 7 are drawn for the condition of phase agreement of the supplies to the stator windings, but if these supplies are not in phase agreement the fields will be oppositely directed at some other inclination relatively to the stators, and the rotor (if unrestrained) will take up a position corresponding to this other inclination. Thus for example, if the supply to the winding of stator 24 lagged in phase 90° behind the supply to the winding of stator 25, the field directions at the instant shown in Figure 4 would be in quadrature as indicated by the dotted arrow N' for the field of stator 24, and would not come into opposition until both fields had turned through 45°, this inclination corresponding to the new zero current position taken up by the rotor.

Considering the case of the alternator $A_2$ shown in Figure 1, the tie-breaker switch $TB_2$ is open so that the winding 26 of the dynamo-electric machine $M_2$ is connected to the tie bars and the winding 27 is connected to the output lines of the alternator. Supporting the turbine $T_2$ is started up by opening a main air valve, not shown, the alternator will commence to generate but its frequency will not be the same as that of the tie bars. The rotor 13 will accordingly rotate in a direction depending upon whether the alternator frequency is greater than or less than the tie-bar frequency. The transmissions 11 and 12 and the governor $G_2$ are so arranged that such rotation adjusts the throttle valve 10 in the sense necessary to bring the two frequencies into synchronism with one another. When such synchronism is attained to a sufficient accuracy to permit the alternator $A_2$ to pull into step with the tie bars the tie-breaker switch can be closed at any instant at which the output of the alternator is in sufficiently close phase agreement with the tie bars. As already explained, at such instants the rotor 13 is in either of two positions relatively to its stator, and to make use of this property to initiate closing of the tie-breaker switch a two-lobed cam 35 is secured to the shaft 36 of the rotor and in each of the said two positions closes a pair of contacts 37. The contacts 37 are arranged in series with a pair of contacts 38, the closing of which is controlled by a thermal delay action device 39 in a circuit which includes the closing coil 16 of the tie-breaker switch $TB_2$, a selector switch 40 and a press-button switch 41. By adjusting the selector switch to a position corresponding to the altrenator to be paralleled and then pressing the button switch 41 a source of current 42 is connected to the circuit containing the closing coil 16. Each time the rotor 13 comes into a position corresponding to phase agreement between the alternator $A_2$ and the tie bars the contacts 37 are closed and a circuit is established from the source 42 through the heating coil 43 of the delay action device 39, but the contacts 38 of the latter do not close unless the rotor 13 is moving so slowly that the delay action device has time to operate before the contacts 37 re-open. By adjusting the closing time of delay-action device it can therefore be arranged that the circuit through the closing coil of the tie-breaker switch is not completed until the alternator $A_2$ is sufficiently nearly in synchronism with the tie bars to pull into step when the tie-breaker switch is closed. Energisation of the closing coil 16 is preferably indicated by a lamp 44, so that the button 41 can then be released. To permit any alternator to be started up and connected immediately to the tie bars when these latter are not already energised by another alternator, a circuit 45 is provided which by-passes the contacts 37 and 38 and contains as many pairs of contacts in series as there are other alternators, one pair of such contacts being opened concurrently with the closing of each tie-breaker switch pertaining to such alternators. These groups of contacts are represented by the "boxes" 46. This and certain other features of Figure 1 are also described in the specification accompanying our co-pending application United States Serial No. 539,582, filed October 10, 1955.

To enable any alternator to be disconnected at will from the tie bars a separate push button 47 is provided for each alternator which completes a circuit from a source 48 through the release coil 17 of the corresponding tie-breaker switch.

Considering the case of the alternator $A_3$ shown in Figure 1, the tie-breaker switch $TB_3$ has closed after the alternator has been brought into synchronism with the tie-bars as already explained. The winding 26 of the dynamo-electric machine $M_3$ has been short-circuited upon itself by the changing over of the switch 14 and has then no further primary effect in controlling the torque acting upon the rotor 13. At the same time the winding 27 has been converted by the changing over of the switch 18 into a two-phase winding one phase of which is connected between the output lines $Lb$ and $Lc$ of the alternator $A_3$ and the other phase of which is connected across the secondary winding of the current transformer $CTa_3$ in the output line $La$ of the alternator $A_3$ and across the secondary winding $CTb_3$ (not shown) in the output line $La$ of the alternator $A_4$ (not shown). As described more fully in the specification accompanying our patent application United States Serial No. 539,584, filed October 10, 1955, now Patent No. 2,791,701, granted May 7, 1957, the current transformers are arranged so that the difference between their secondary currents flows through the second phase of the winding 27, by way of the conductors $27a$ and $27e$, so that torque is developed upon the rotor 13 which is proportional to the amount by which the ratio of the loads on the alternators $A_3$ and $A_4$ differs from a desired ratio of such loads, the direction of rotation of the rotor 13 being arranged such that its movement adjusts the governor $G_3$ and hence the throttle valve 10 in the sense to adjust the power developed by the turbine $T_3$ to eliminate such difference. When an alternator has been disconnected from the tie bars by the opening of its associated tie-breaker switch, as is the case of the alternator $A_2$ of Figure 1, it is of course no longer available as a load reference for the preceding alternator. Opening of the tie-breaker switch is therefore arranged to close a switch 49 which connects the second phase of the winding 27 of the dynamo-electric machine pertaining to the preceding alternator also across the secondary winding of the current transformer in the output line $La$ of the succeeding alternator. The changing over of the switch 18 at the same time prevents actuation of the dynamo-electric machine $M_2$ in response to errors in the load-sharing between the alternators still connected to the tie bars.

While in the foregoing description reference has been made to only one of the several possible alternative forms of dynamo-electric machines described in United States Patent No. 2,296,177, granted September 15, 1942, and British Patent No. 516,613, filed May 11, 1938, accepted January 5, 1940, and sealed and granted March 28, 1940, it is to be understood that any of the forms of such machines therein described can be used for the performance of the present invention. Furthermore it will be appreciated that such machines can be constructed as multipolar machines, in which case there will be two positions for each pair of poles which the rotor may take up at instants of phase agreement. The invention is also applicable to systems in which, for load-sharing control, the load on each alternator is compared with the total load on all the alternators paralleled at any time, or with the load on all the other alternators paralleled at any time. Systems of this kind are described for example in the specification accompanying our patent application United States Serial No. 539,584, filed October 10, 1955, now Patent No. 2,793,302, granted May 21, 1957.

We claim:

1. The combination in a polyphase alternating current system comprising a common utilization network, and a plurality of prime-mover-alternator units having alternators for connection in parallel to said utilization network of, for at least one of the prime-mover-alternator units, a single dynamo-electric machine having a rotor, at least one fixed stator, and two polyphase windings energizable from separate sources to cause the rotor to rotate at a speed proportional to the difference between the frequencies of the said sources, power controlling means for controlling the power transmitted from the prime-mover of the unit to the alternator of the unit, means operatively connecting the rotor to the power controlling means, change over switch means which in one position connects one of said polyphase windings to the utilization network and the other of said polyphase windings to the output of the alternator of the unit so as to cause said rotor to rotate at a rate proportional to the difference between the frequency of the network and the frequency of the alternator of the unit to adjust the power control means in the sense to reduce the frequency difference, a tie-breaker switch for connecting the alternator of the unit to the utilization network, means associated with the rotor for closing the tie-breaker switch when the rotor is in a position relative to said stator corresponding to phase agreement of the supplies to said polyphase windings and when the difference between the frequencies of said supplies is within the pull-in range of the alternator of the unit, said change over switch means, in a further position, changing over the dynamo-electric synchronizing machine, when the associated alternator has been paralleled, to operate the power control means in response to changes in the ratio of the load on the associated alternator to the load on at least one of the other alternators.

2. The combination as claimed in claim 1, in which the tie-breaker switch comprises electro-magnetic operating means, and the tie-breaker switch closing means comprises first switch contacts closed by said rotor in each position of the rotor relative to said stator corresponding to phase agreement of the supplies of said polyphase windings and for a period of time dependent upon the rate of rotation of said rotor, delay action means set in operation by the closing of said first switch contacts, and second switch contacts closed after a fixed period of time by said delay action means, said first and second switch contacts being arranged in series circuit with said electro-magnetic operating means.

3. The combination as claimed in claim 2, in which said delay action means comprises a thermal delay action device.

4. The combination as claimed in claim 2, in which the first switch contacts are operated by a cam driven by the rotor.

5. The combination as claimed in claim 1, in which the power controlling means comprises means for controlling the supply of working fluid to the prime mover.

6. The combination as claimed in claim 5, and a variable datum speed governor for controlling the speed of the prime-mover of the unit, and means for adjusting the datum setting of the governor in response to rotation of said rotor.

7. The combination as claimed in claim 1, in which the change-over switch means is controlled by the said means associated with said rotor for actuating said tie-breaker switch so that on closure of the tie-breaker switch the said switch means are operated.

8. The combination in a polyphase alternating current system as claimed in claim 1 in which said change over switch means in said further position, when the associated alternator has been paralleled, reconnects the polyphase windings to cause the dynamo-electric synchronizing machine to operate the power control means in response to changes in the ratio of the load on the associated alternator to the load on at least one of the other alternators.

References Cited in the file of this patent

UNITED STATES PATENTS

| Re. 20,548 | Doyle | Nov. 9, 1937 |
| 1,820,319 | Pearson | Aug. 25, 1931 |
| 1,944,996 | Pearson | Jan. 30, 1934 |
| 1,994,418 | Muller | Mar. 12, 1935 |
| 2,067,944 | Pearson | Jan. 19, 1937 |
| 2,076,588 | Pearson | Apr. 13, 1937 |
| 2,296,177 | Newton | Sept. 15, 1942 |
| 2,383,306 | Hanna et al. | Aug. 21, 1945 |
| 2,501,340 | Kresser | Mar. 21, 1950 |
| 2,590,023 | Lewis et al. | Mar. 18, 1952 |
| 2,710,355 | Chilman et al. | June 7, 1955 |
| 2,791,700 | Chilman et al. | May 7, 1957 |
| 2,791,701 | Chilman et al. | May 7, 1957 |
| 2,793,302 | Chilman et al. | May 21, 1957 |

FOREIGN PATENTS

| 516,613 | Great Britain | Oct. 10, 1955 |